(12) United States Patent
Meyers et al.

(10) Patent No.: US 8,682,560 B2
(45) Date of Patent: Mar. 25, 2014

(54) VEHICLE STABILITY CONTROL SYSTEM AND METHOD

(75) Inventors: Joseph Carr Meyers, Farmington Hills, MI (US); Daniel Domek Eisele, Ann Arbor, MI (US); Todd Allen Brown, Dearborn, MI (US); Li Xu, Novi, MI (US); Albert Chenouda Salib, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/434,278

(22) Filed: Mar. 29, 2012

(65) Prior Publication Data

US 2012/0185142 A1 Jul. 19, 2012

Related U.S. Application Data

(62) Division of application No. 11/929,901, filed on Oct. 30, 2007, now Pat. No. 8,170,767.

(51) Int. Cl.
*B60T 7/12* (2006.01)
*B60T 8/60* (2006.01)

(52) U.S. Cl.
USPC ............................................. 701/78; 303/155

(58) Field of Classification Search
USPC .................................. 701/1, 48, 78
See application file for complete search history.

(56) References Cited

U.S. PATENT DOCUMENTS

| | | |
|---|---|---|
| 4,762,196 A | 8/1988 | Harada et al. |
| 4,809,183 A | 2/1989 | Eckert |
| 5,079,708 A | 1/1992 | Brown |
| 5,083,631 A | 1/1992 | Nakayama et al. |
| 5,365,443 A | 11/1994 | Tsuyama et al. |

(Continued)

FOREIGN PATENT DOCUMENTS

| | | |
|---|---|---|
| DE | 3606797 A1 | 3/1986 |
| DE | 10128357 A1 | 3/2003 |
| DE | 102005053864 A1 | 5/2007 |
| JP | 2003-118556 A | 4/2003 |

OTHER PUBLICATIONS

British Search Report from British Application No. GB 0819743.6 filed Oct. 28, 2008.

(Continued)

*Primary Examiner* — Muhammad Shafi
(74) *Attorney, Agent, or Firm* — O'Brien Jones PLLC; Raymond L. Coppiellie

(57) ABSTRACT

A method and system for controlling vehicle stability may comprise determining whether a vehicle is oversteering or understeering and, if the vehicle is oversteering or understeering, determining an amount by which to reduce a speed of the vehicle to correct for understeering or oversteering and applying brake pressure to at least the rear brakes of the vehicle to reduce vehicle speed. The method and system also may comprise determining an engine torque reduction amount based on vehicle oversteer or understeer conditions, reducing engine torque by the determined amount or to zero if the determined amount of engine torque reduction is greater than an actual engine torque, and applying braking to at least the rear brakes of the vehicle if the determined amount of engine torque reduction is greater than the actual engine torque.

18 Claims, 7 Drawing Sheets

(56) References Cited

U.S. PATENT DOCUMENTS

| | | |
|---|---|---|
| 5,497,333 A | 3/1996 | Sasaki |
| 5,704,695 A | 1/1998 | Monzaki et al. |
| 5,850,616 A | 12/1998 | Matsuno et al. |
| 6,155,655 A * | 12/2000 | Matsuno ................. 303/140 |
| 6,829,528 B1 | 12/2004 | Kang et al. |
| 6,954,690 B2 * | 10/2005 | Watanabe et al. ............. 701/71 |
| 8,395,491 B2 | 3/2013 | Kümmel et al. |
| 2002/0056582 A1 * | 5/2002 | Chubb et al. ............. 180/197 |
| 2002/0109402 A1 * | 8/2002 | Nakamura ................. 303/146 |
| 2003/0102713 A1 | 6/2003 | Murakami |
| 2003/0130782 A1 * | 7/2003 | Check et al. ............... 701/91 |
| 2004/0239179 A1 | 12/2004 | Kato et al. |
| 2005/0057095 A1 * | 3/2005 | Hac ........................... 303/122 |
| 2005/0132618 A1 * | 6/2005 | Koch ........................... 37/348 |
| 2006/0253471 A1 | 11/2006 | Wasserman et al. |
| 2007/0219699 A1 | 9/2007 | Graf |

OTHER PUBLICATIONS

British Examination Report from British Application No. GB 0819743.6 filed Oct. 28, 2008.
Office Action dated Jan. 18, 2011 issued in co-pending U.S. Appl. No. 11/929,901.
Office Action dated May 12, 2011 issued in co-pending U.S. Appl. No. 11/929,901.
Chinese Notification of First Office Action, Application No. 200810175203.9, dated Feb. 5, 2013.
German Official Office Action, Application No. DE 10 2008 045 261.0-51, dated Dec. 13, 2010.

\* cited by examiner

VEHICLE STABILITY CONTROL SYSTEM AND METHOD

This is a divisional application of application Ser. No. 11/929,901, filed Oct. 30, 2007, the entire disclose of which is incorporated herein by reference.

FIELD

The present invention relates generally to a motor vehicle stability control system that regulates the longitudinal tire forces of a vehicle to improve the vehicle's lateral stability indirectly.

INTRODUCTION

The primary objectives of electronic stability control (ESC) systems are to prevent vehicles from spinning (oversteer) or plowing out (understeer). Prevention of oversteer and understeer is generally achieved by controlling the vehicle in response to both yaw rate and sideslip angle, which are values indicative of lateral motion of a vehicle. Using a vehicle's steering wheel angle as a gauge of the driver's desired yaw rate, the system determines the difference between desired yaw rate and actual yaw rate, and can take measures to help the driver stay on course. On low friction surfaces, however, controlling only a vehicle's yaw rate may not be sufficient to prevent the vehicle's sideslip angle from building up. Large sideslip angles are generally undesirable because they cause reduced maneuverability or controllability of the vehicle. For stability in all driving conditions, sideslip angle (and its derivative(s)) can be used by the system as an additional feedback signal.

Electronic stability control systems normally rely on the application of brake pressure for control authority. Application of brake pressure at an appropriate corner of the vehicle can generate a yaw torque to directly correct understeering or oversteering of the vehicle. Therefore, electronic stability control can also be referred to as direct yaw control. In some instances, the applied corrective yaw torque may not be enough to keep the vehicle on the road, for example when the speed of the vehicle is too great for available traction. In such a case, it may be desirable to slow the vehicle by reducing engine torque and/or applying four-wheel braking. At a reduced speed, a cornering tire force required to balance the centrifugal force can be reduced to the point where the vehicle can negotiate a curve and the average driver will be able to regain control of the vehicle, without being reduced at a rate or to a degree that itself causes any loss of control. Thus, vehicle lateral stability can be indirectly improved by controlling longitudinal tire forces. Longitudinal tire forces are the forces generated by the tire parallel to the direction the tire is rolling (front to back). Longitudinal tire forces can be manipulated directly with the vehicle brakes and the powertrain.

SUMMARY

The present invention may address one or more of the above-mentioned issues. Other features and/or advantages may become apparent from the description which follows.

Various exemplary embodiments of the invention provide a method and system for controlling vehicle stability. The method and system may comprise determining whether a vehicle is oversteering or understeering and, if the vehicle is oversteering or understeering, determining an amount by which to reduce a speed of the vehicle to correct for understeering or oversteering and applying brake pressure to at least the rear brakes of the vehicle to reduce vehicle speed.

Various exemplary embodiments of the invention alternatively or additionally provide a method and system that comprise determining an drive axle torque amount based on vehicle understeer or oversteer conditions, reducing engine torque by the determined amount or to zero if the determined axle torque is less than zero, and applying braking to at least the rear brakes of the vehicle if the determined axle torque is less than zero.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF VARIOUS EMBODIMENTS

Reference will now be made to various embodiments, examples of which are illustrated in the accompanying drawings. However, these various exemplary embodiments are not intended to limit the disclosure. To the contrary, the disclosure is intended to cover alternatives, modifications, and equivalents.

Figure 1:
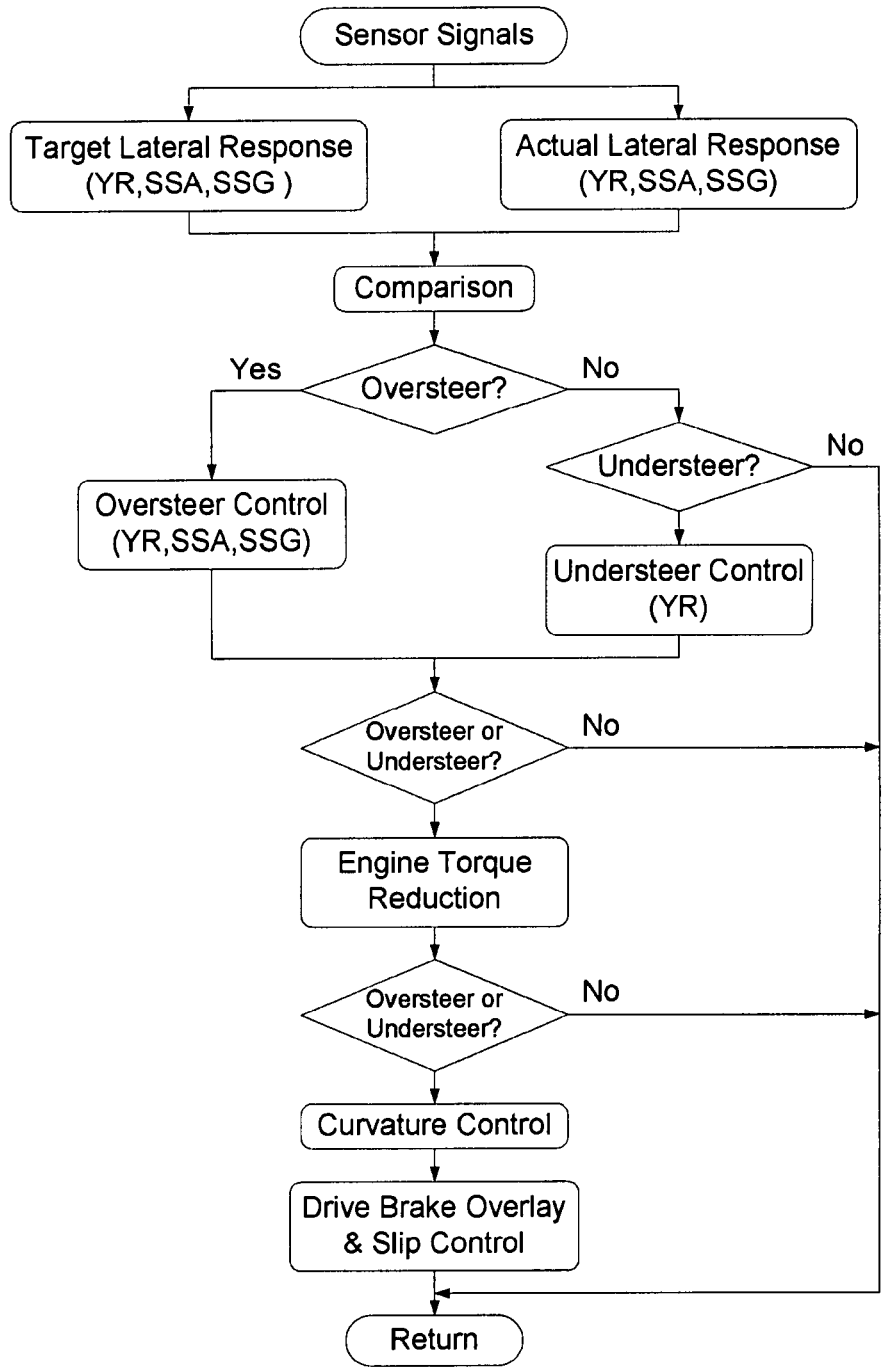
FIG. 1 is a flow diagram illustrating an exemplary embodiment of a vehicle stability control system and method according to the present teachings.

FIG. 1 is a flow diagram illustrating the teachings of an embodiment of a vehicle stability control system and method of the present invention. As shown, from sensor signals such as, for example, steering wheel angle and vehicle speed, as well as a vehicle model, a target lateral response (or driver intent) is derived and an actual lateral response is either directly measured (e.g., via yaw rate (YR)) or estimated (e.g., via sideslip gradient (SSG) and sideslip angle (SSA)) for example via a controller. A controller of the present invention can include one or more controllers and can be integrated into an existing vehicle roll stability controller or yaw stability controller or can be a dedicated controller receiving one or more inputs from the roll stability controller and/or the yaw rate controller. The controller can evaluate vehicle speed and road condition, as well as the actual and the target lateral responses. The controller can also compare target and actual lateral responses and, if the controller determines that the vehicle motion deviates too much from the driver intent, it can apply brake pressure at the outside corners (oversteer situations) or inside corners (understeer situations) of the vehicle to reduce the deviation. Depending on how effectively vehicle motion is corrected (i.e., how effectively the deviation is reduced), the controller can then determine whether it is necessary to further slow the vehicle by reducing engine torque and/or applying two- or four-wheel braking. From a driver's point of view, engine torque reduction can be preferable to braking, because it generally feels less intrusive.

Figure 8:
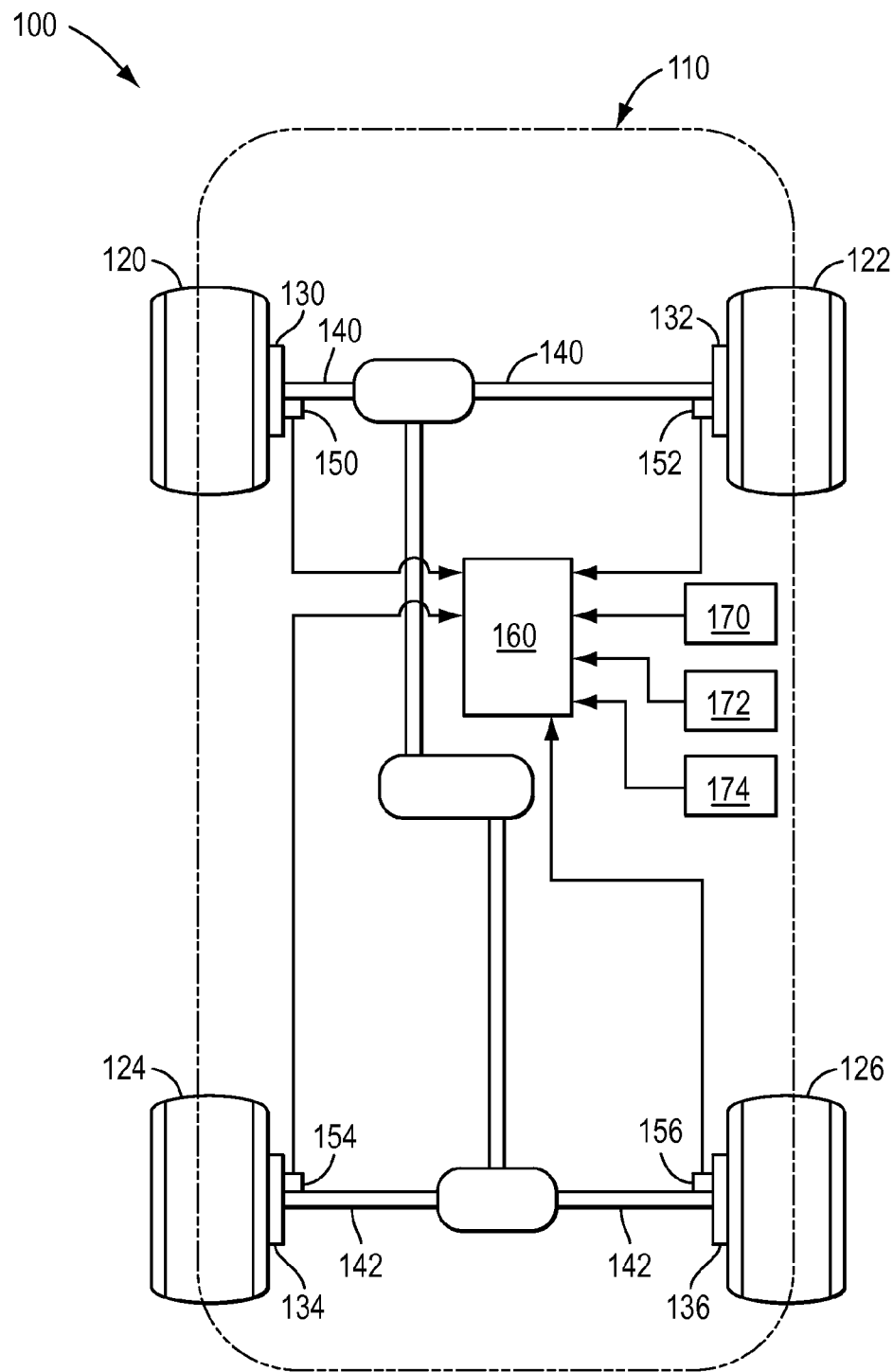
FIG. 8 is a schematic diagram illustrating an exemplary embodiment of a vehicle stability control system in accordance with the present teachings.

FIG. 8 is a schematic diagram illustrating an exemplary embodiment of a vehicle stability control system 100 in accordance with the present teachings. As illustrated in FIG. 8, a vehicle 110 may have wheels 120, 122, 124, and 126 with respective brakes 130, 132, 134, and 136 (collectively representing a brake system of vehicle 110). Front wheel 120 and brake 130 are mounted on the left side of front axle 140 and front wheel 122 and brake 132 are mounted on the right side. Rear wheel 124 and brake 134 are mounted on the left side of rear axle 142 and rear wheel 126 and brake 136 are mounted on the right side. System 100 may include various vehicle sensors, including, for example, wheel-speed sensors 150, 152, 154, and 156, steering wheel angle sensor 170, yaw-rate sensor 172 and lateral-acceleration sensor 174, which send signals to a controller 160.

Figure 2:
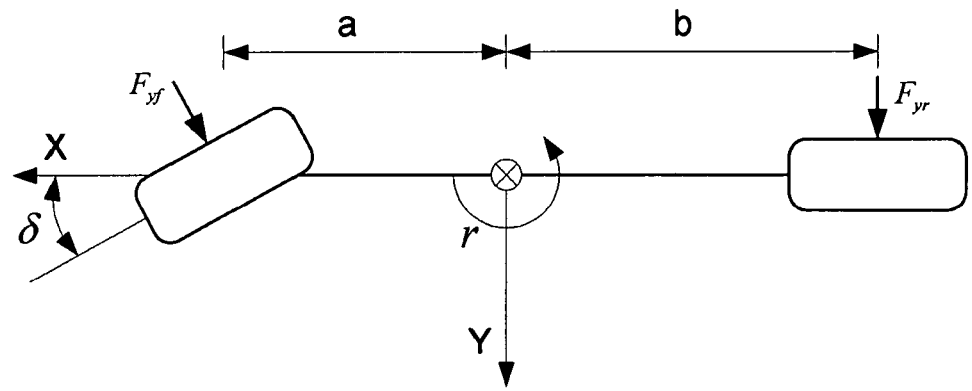
FIG. 2 is a linear two-degree-of-freedom bicycle model.

To reduce engine torque, various exemplary embodiments of the present teachings can utilize an engine torque reduction (ETR) module that limits or reduces the driver's throttle input to decrease vehicle speed, which can improve the vehicle's lateral stability. The engine torque reduction module can use as its control signal the difference between the measured yaw rate and the target yaw rate (or the difference between the target and actual lateral response measurements). The driver's desired yaw rate can be estimated using a linear two-degree-of-freedom bicycle model based on steering wheel angle and speed (see FIG. 2). This target represents idealized vehicle behavior on high μ. High μ is a high road surface friction corresponding, for example, to dry asphalt.

From this control signal, the engine torque reduction module can determine a torque command that can be realized by the vehicle's powertrain and perhaps its brake systems. It can help a driver maintain control of a vehicle when the vehicle has entered a curve at too high a speed. It can also be used to prevent a driver from accelerating to a speed that is too high for a particular curve.

An engine torque reduction module reduces engine torque to slow a vehicle, causing a decrease in the vehicle's turning radius. If necessary, the engine torque reduction module can send a decelerative torque request to a curvature control module that uses braking to slow the vehicle additionally and/or more quickly.

In some exemplary embodiments, the engine torque reduction module is intended to control longer term understeer and oversteer and remain inactive or limited during transient conditions. In such embodiments, a check for quasi steady-state cornering can be utilized. The direction of the target yaw rate (or target lateral response), the measured yaw rate (or actual lateral response), and the lateral acceleration can be aligned when the vehicle is not transitioning from one direction to another. If this steady-state cornering check is not met, control deadbands of the engine torque reduction module can be increased, as described below, desensitizing the engine torque reduction module's control during transient maneuvers. Control deadbands are control signal ranges where no action occurs in the engine torque reduction module.

To limit the engine torque reduction module's vehicle control to appropriate situations and leave throttle control to the driver in normal driving circumstances, certain embodiments of the present invention can use dynamic control activation deadbands that increase and decrease in size. In various exemplary embodiments, these deadbands can be the sum of three components, a yaw rate controller deadband, a steady-state cornering component, and a transition component that can be based on sideslip angle. The yaw rate controller deadband can be included so that the engine torque reduction module activates after the yaw controller, which is designed to control yaw rate over relatively short time periods compared to the engine torque reduction module. The deadbands take the following form:

$$DB_{ETR} = DB_{yawcontrol} + DB_{steadystate} + \max(0, k_{sideslip} * (\mu * CC_{rear} \pm \text{Sideslip}_{linear})) \quad (1)$$

where μ is the estimate of the coefficient of friction in g, $CC_{rear}$ is the cornering compliance of the rear axle in deg/g, $k_{sideslip}$ is a gain that determines the magnitude of the contribution of the transition component based on the sideslip angle, and $\text{Sideslip}_{linear}$ is a linear estimate of the sideslip at the rear axle in degrees. $\text{Sideslip}_{linear}$ can be calculated outside of the curvature control and engine torque reduction modules. It is calculated using a linear bicycle model with constant cornering compliances and assuming a high μ. Cornering compliance is a measure of how much slip angle at the front or rear axle will build with lateral acceleration in (slip angle (in degrees))/(lateral acceleration (in g's)). $\text{Sideslip}_{linear}$ can be subtracted from the other terms for left turns and added for right turns, assuming ISO sign convention. This transition component is larger when the side slip estimate is small and smaller when the side slip estimate is large. The transition component desensitizes the engine torque reduction module's control during transitional maneuvers. The transition component of the deadband desensitizes the controller during transitions because $\text{Sideslip}_{linear}$ becomes small or zero during the transition. This leaves $\mu * CC_{rear}$, which is a positive constant, as the dominant term. During steady state, $\text{Sideslip}_{linear}$ is equal to or close to $\mu * CC_{rear}$ and they cancel each other out or almost cancel each other out, which makes the deadband term smaller and the controller more sensitive. During transition, when $\text{Sideslip}_{linear}$ does not cancel $\mu * CC_{rear}$, the deadband component is at a maximum and the controller is desensitized. In addition to the transition component, $DB_{steadystate}$ increases to a larger value when the steady state cornering check is not met and decreases to a smaller value when the steady state cornering check is met. Both $DB_{yawcontrol}$ and $DB_{steadystate}$ have different ranges depending on whether the vehicle is understeering or oversteering.

The control signal for the engine torque reduction module can be calculated for all four cases of turning left or right with understeer or oversteer. For example, turning left, understeer:

$$\text{YawSignal}_{ETR} = \dot{\psi}_{tgt} - \dot{\psi}_{measured} - DB_{ETR,L,US} \quad (2)$$

Turning right, understeer:

$$\text{YawSignal}_{ETR} = \dot{\psi}_{measured} - \dot{\psi}_{tgt} - DB_{ETR,R,US} \quad (3)$$

Turning left, oversteer:

$$\text{YawSignal}_{ETR} = \dot{\psi}_{measured} - \dot{\psi}_{tgt} - DB_{ETR,L,OS} \quad (4)$$

Turning right, oversteer:

$$\text{YawSignal}_{ETR} = \dot{\psi}_{tgt} - \dot{\psi}_{measured} - DB_{ETR,R,OS} \quad (5)$$

The largest of these four values is used as the engine torque reduction module control signal. The engine torque reduction module control signal is then multiplied by −1 so that positive values increase the engine torque request and show that the yaw rate error is smaller in magnitude than the deadband. Negative values of the engine torque reduction module control signal signify that engine torque should be decreased and indicate that the yaw rate error is greater than the deadband.

$$\text{YawSignal}_{ETR} = -1 * \text{YawSignal}_{ETR} \quad (6)$$

The controller can perform PID control (proportional, integral, derivative control for automatically adjusting variables to hold a value constant) of the axle torque based on the control signal (see equation 6) using the equations:

$$T_{proportional} = k_p * \text{YawSignal}_{ETR} \quad (7)$$

$$T_{derivative} = k_d * \frac{d \text{YawSignal}_{ETR}}{dt} \quad (8)$$

$$T_{integral} = k_i * \int \text{YawSignal}_{ETR} * dt \quad (9)$$

The requested axle torque from engine torque reduction module can then be defined as:

$$T_{ETR} = T_{derivative} + T_{proportional} + T_{integral} \quad (10)$$

In addition, $T_{ETR}$ can be filtered and its rate of change can be limited so that control actuation is smooth and progressive. If $T_{ETR} < 0$, the engine will not be able to realize the torque request. In this case, the torque request can be sent to a curvature control module where the brakes can be applied to generate the necessary deceleration, as described below.

In accordance with various exemplary embodiments of the present teachings, the control logic can require that three conditions are met to activate the engine torque reduction module:

$$\text{YawSignal}_{ETR} < 0 \quad (11)$$

$$T_{ETR} < T_{Driver} \quad (12)$$

$$T_{ETR} < T_{TCS} \quad (13)$$

where $T_{Driver}$ is the driver axle torque request estimated from throttle and engine speed, and $T_{TCS}$ is the TCS axle torque request. If the engine torque reduction module is already active, the first condition (shown in equation 11) may not be used. In such a case, the engine torque reduction module request will be increasing toward the driver and traction control system (TCS) requests. The engine torque reduction module can remain active until its request has matched the lower of the driver and TCS requests, maintaining a smooth transition out of the engine torque reduction module's control. When the engine torque reduction module is not active, $T_{integral}$ is set according to:

$$T_{integral} = \min(T_{Driver}, T_{TCS}) - T_{derivative} - T_{proportional} \quad (14)$$

This initializes the integral component of PID control so that the total torque request of the engine torque reduction module can be held at the smaller of the driver and TCS torque requests until activation occurs. Upon activation, the engine torque reduction module torque request can follow PID control to ensure that the torque request is continuous when transitioning from inactive to active control states.

However, the most an engine torque reduction module can typically do is take away a driver's throttle input and let the vehicle slow itself via inertia (coast). In cases where a controller determines that a vehicle should be slowed more quickly or to a greater extent, a curvature control module can be employed to activate and apply brake pressure to two or four wheels. A curvature control module can be employed in addition to an engine torque reduction module or as an alternative to an engine torque reduction module. Further, the curvature control module can be a part of the engine torque reduction module, or can be an independent module. The curvature control module can run on the same controller as the engine torque reduction module, or can run on its own controller or a controller shared with other modules for vehicle control. Compared with engine torque reduction, which can reduce the driving force, curvature control can impose a negative longitudinal force (or drag force) on the vehicle.

Figure 4:
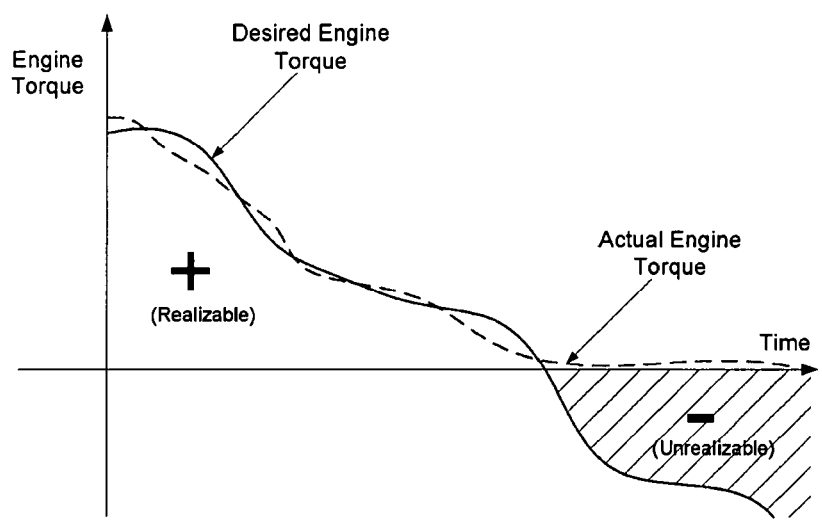
FIG. 4 illustrates an exemplary embodiment of an engine torque request that includes a negative engine torque request.
Figure 3:
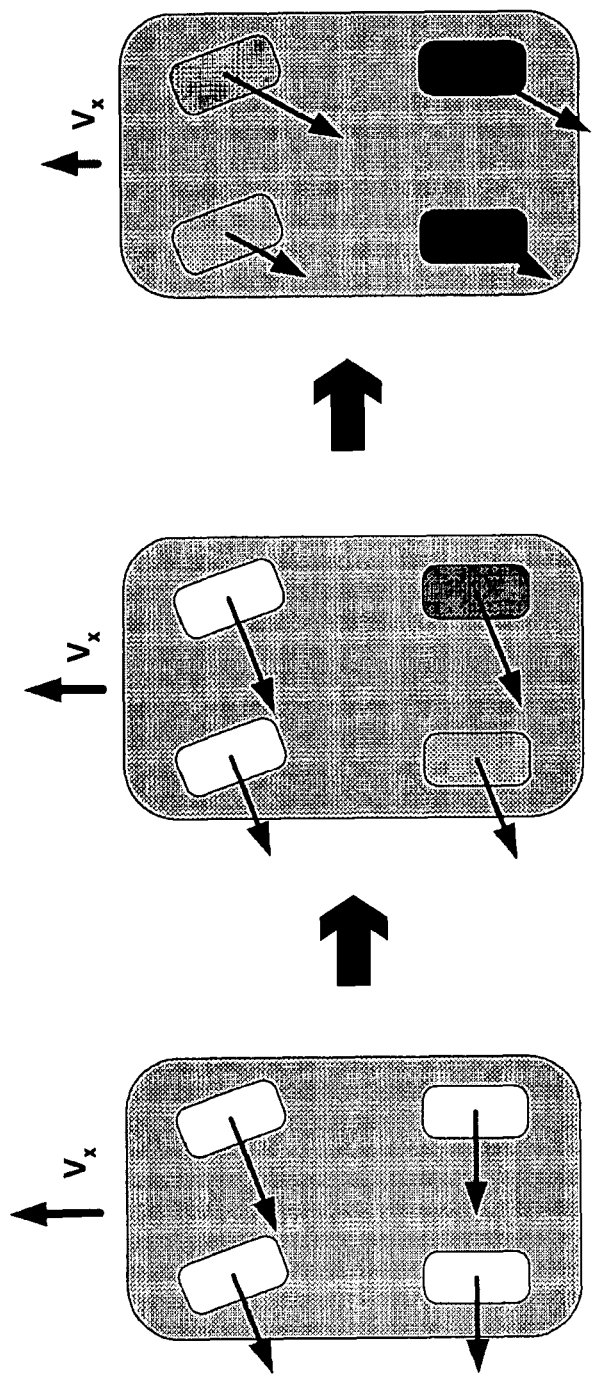
FIG. 3 schematically illustrates distribution and realization of longitudinal tire force by regulating brake pressure at each wheel in accordance with various exemplary embodiments of the present teachings.

In an exemplary embodiment of the present teachings, in a case where the conditions of vehicle oversteer or understeer are so great that the curvature control module should be utilized, the curvature control module receives an (unrealizable) negative engine torque request (see FIG. 4), for example from the engine torque reduction module. A negative engine torque request results from the controller determining that vehicle speed should be reduced by an amount or rate greater than can be achieved by reduction of throttle input—e.g., the controller has determined that the engine not only needs to stop adding to vehicle speed, but also needs to apply a certain amount of drag on the vehicle (and the engine generally cannot be used to apply a sufficient drag on the vehicle). The curvature control module can translate the negative engine torque request into a longitudinal force, as described in more detail below. The longitudinal force can then be distributed and realized by regulating brake pressure at each wheel, as illustrated in FIG. 3. Thus, a negative engine torque request is input to the curvature control module, which converts that request into braking commands for each wheel on the vehicle.

According to some exemplary embodiments, in a steady-state cornering event, curvature control does not make the vehicle oversteer or understeer, and can allow the vehicle to remain within a predetermined percentage of its maximum cornering capacity to maintain a proper balance between short-term and long-term path curvature optimization tradeoffs. The curvature control algorithm can employ an automatic braking algorithm that prevents oversteering and understeering, allows the vehicle to remain within a predetermined percentage of its maximum cornering capacity, and can be effective in reducing turning radius by regulating brake pressure at each wheel.

For sustained driver over-command of steering wheel angle (e.g., understeer, where the driver is commanding more yaw rate with the steering wheel than the vehicle can deliver, including events beyond a transient event such as a two-lane change or making a right or left turn), the vehicle's electronic stability control may determine that the vehicle cannot achieve the driver desired path for the given vehicle speed and road conditions. In some cases, any resulting applied corrective direct yaw torque cannot significantly increase the net cornering power or ability of the vehicle to match the driver's desired yaw rate without forcing the vehicle into a buildup of sideslip angle. Therefore, the engine torque reduction module reduces engine torque to slow the vehicle to allow a decrease in turning radius. However, engine torque reduction may not be able to reduce vehicle speed quickly enough, since engine response can be relatively slow, and in general cannot be used to impose a drag force on the vehicle. Further, engine torque reduction only works when the driver is on throttle; since otherwise, there is no throttle input to deduct from. Nevertheless, the engine torque reduction module may determine that it is necessary to further slow the vehicle via a negative torque/force (see FIG. 4), which generally cannot be realized by the vehicle's engine. Although downshifting can perhaps add some drag, often, particularly with an automatic transmission, more drag may be desired than the transmission can achieve.

Figure 5:
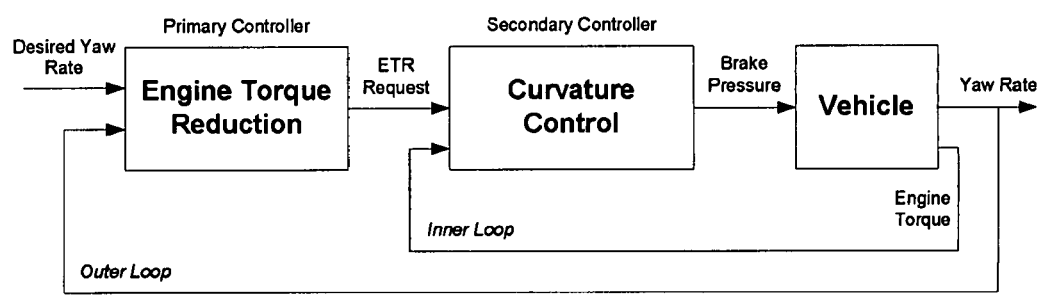
FIG. 5 illustrates how an engine torque reduction module and a curvature control module can work together in accordance with various exemplary embodiments of the present teachings.

In accordance with some exemplary embodiments of the present teachings, curvature control and engine torque reduction modules can work together, as illustrated in the schematic diagram of FIG. 5, to slow the vehicle. If the engine torque reduction module requests a positive drive torque value that is smaller than a driver throttle value or engine traction control request value (in a vehicle where traction control is occurring simultaneously and its value is compared with the engine torque reduction module request and whichever is smaller is used), the engine torque is reduced, but not completely taken away (i.e., it is reduced to the requested positive drive torque value). On the other hand, if the requested drive torque value is negative, it is determined that not only should the engine torque be eliminated, but also a negative longitudinal force should be applied. The curvature control module is then utilized to translate the "desired" negative engine torque command (or negative longitudinal force) into brake actuator or brake pressure commands.

As illustrated in FIG. 5, in various exemplary embodiments, the engine torque reduction module can receive feedback in the form of actual yaw rate, which can be used to control torque reduction. Similarly, the curvature control module can receive feedback in the form of actual engine torque, which can be used to control braking.

Figure 6:
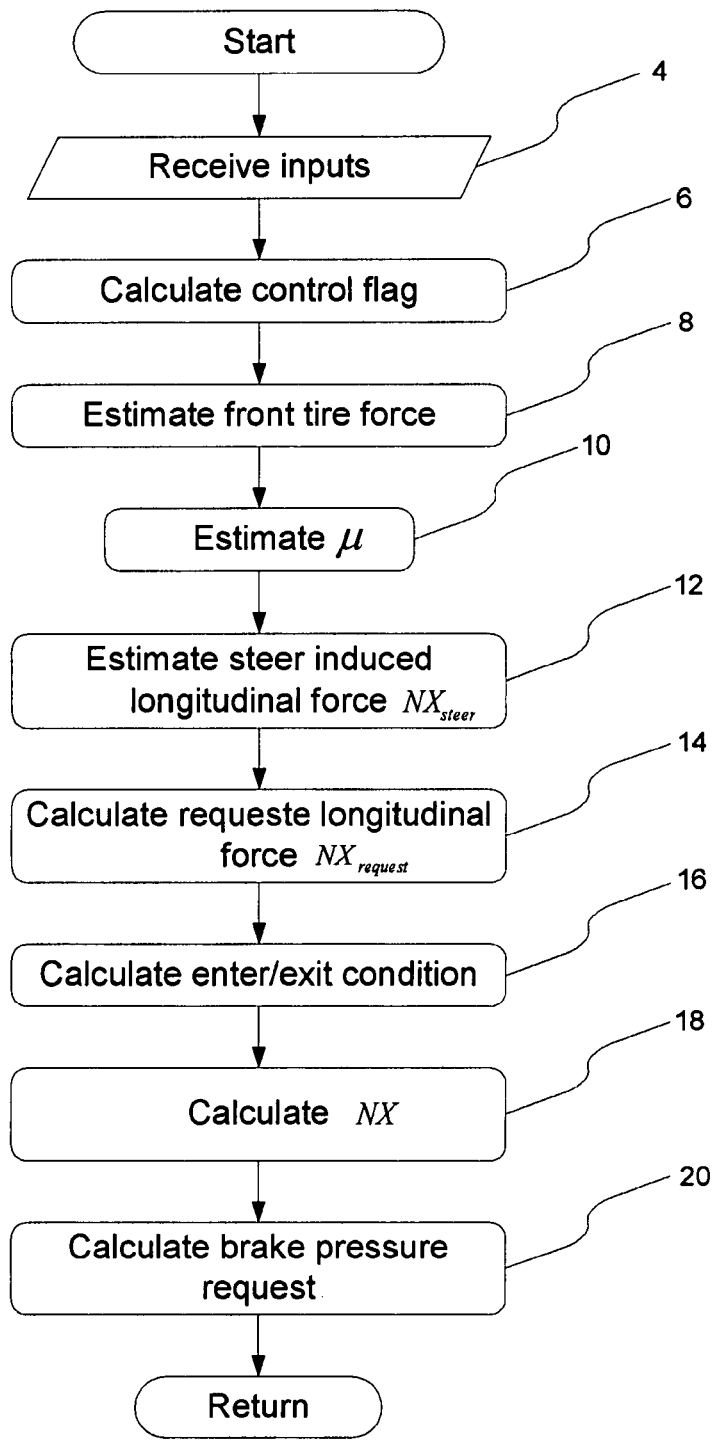
FIG. 6 is a flow diagram for a curvature control module in accordance with various exemplary embodiments of the present teachings.

FIG. 6 illustrates a main flow diagram for the curvature control module in accordance with certain embodiments of the invention. At block 4, inputs are received from various sensors and calculations from previously-executed code (e.g., sideslip angle (as calculated, for example, by an external module), normal load (as calculated, for example, by an external module), and a request from the engine torque reduction module ($T_{ETR}$). Other inputs could include, for example, brake pressure estimates (for each wheel), brake master cylinder pressure, indication of driving direction (forward or backward), longitudinal velocity, indication of the driver applying the brakes, a linear calculation of the front axle slip angle, tire normal load (for each wheel), tire steer angle (or its sine and cosine), a rear sideslip angle estimate. At block 6, the curvature control module determines a control flag and a curvature control torque, as described in more detail below. At block 8, front tire force is calculated or estimated, and is subsequently used to estimate the road friction coefficient μ in block 10. At block 12, the normalized longitudinal force $NX_{steer}$ induced by the driver's steering input is determined, and is used in calculating the requested longitudinal force $NX_{request}$ at block 14. Exit and enter conditions are calculated at block 16, e.g., longitudinal speed being >5 m/s, a counter limiting how long curvature control can activate for, and side slip angle being less than a predetermined angle. The counter can be used to make a smooth transition between application of curvature control and removal of curvature control. A control command (a unitless measure NX between 1 and 0 of how much the vehicle should slow down, which is used to determine pressure values) is determined at block 18 and converted into brake actuator commands (or brake pressure requests) at block 20.

If the engine torque command ($T_{ETR}$) from the engine torque reduction module is negative, a curvature control torque ($T_{CC}$) is calculated, and a flag ($CC_{torque}$) is set to indicate that the curvature control is required:

$$T_{CC} = \min(T_{ETR}, 0) \tag{15}$$

$$CC_{torque} = (T_{CC} < 0) \tag{16}$$

The rest of the algorithm translates $T_{CC}$ into a normalized negative longitudinal force, which is then redistributed to the four corners of the vehicle in proportion to the normal load on that corner.

Figure 7:
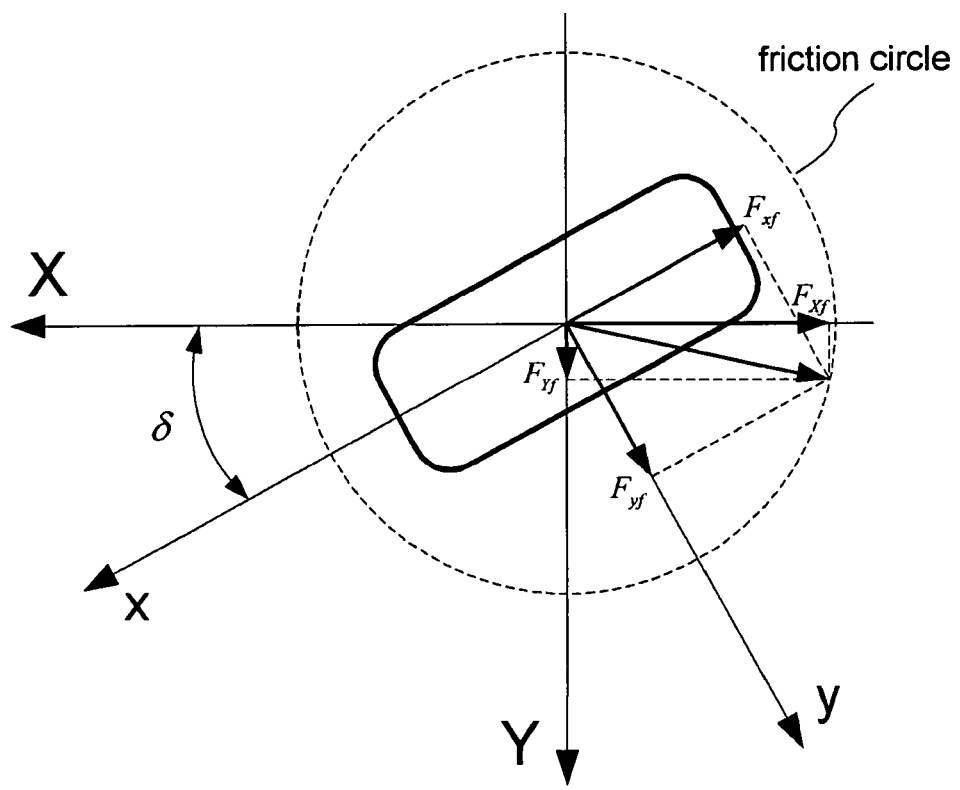
FIG. 7 illustrates a friction circle.

The front tire lateral force in vehicle plane ($F_{Yf}$) is estimated based on lateral acceleration ($a_y$) and the derivative of yaw rate ($\dot{r}$):

$$F_{Yf} = M \cdot a_y \cdot \frac{b}{a+b} + \frac{I_z}{a+b} \cdot \dot{r} \tag{17}$$

where M is the mass of the vehicle, a is the distance from vehicle center of gravity to front axle, b is the distance from vehicle center of gravity to rear axle, and $I_z$ is the moment of inertia about the yaw axis. $F_{Yf}$ is then converted to the lateral force in tire plane (see FIG. 7):

$$F_{yf} = \frac{F_{Yf} - F_{xf} \cdot \sin\delta}{\cos\delta} \tag{18}$$

$$F_{yfl} = F_{Yf} \cdot \frac{\eta_{fl}}{\eta_{fl} + \eta_{fr}} \tag{19}$$

$$F_{yfr} = F_{yf} - F_{yfl} \tag{20}$$

in which δ is the front wheel steer angle, and $\eta_{fl}$ and $\eta_{fr}$ represent the normalized normal load on front left and front right wheel, respectively. The front longitudinal forces ($F_{xf}$) in the tire plane can be calculated using the estimated caliper pressure ($P_{fl\_est}$, $P_{fr\_est}$):

$$F_{xfl} = -\rho_{F\_Bar2N} \cdot P_{fl\_est} \tag{21}$$

$$F_{xfr} = -\rho_{F\_Bar2N} \cdot P_{fr\_est} \tag{22}$$

$$F_{xf} = F_{xfl} + F_{xfr} \tag{23}$$

where $\rho_{F\_Bar2N}$ is a conversion factor from front brake pressure to longitudinal force, and is a constant with units N/bar.

A rough measure of the road surface friction coefficient (μ) is based on the front tire force information and the lateral acceleration, for example:

$$\hat{\mu} = \max\left(\frac{|a_y|}{g}, \frac{\sqrt{F_{xf}^2 + F_{yf}^2}}{(\eta_{fl} + \eta_{fr}) \cdot M \cdot g}\right) \tag{24}$$

where g is acceleration due to gravity. The computed value $\hat{\mu}$ is further limited to a minimum value of approximately 0.1, and to a maximum value of 1.0. Once $\hat{\mu}$ is determined, the maximum tire force—the product of normal force and $\hat{\mu}$—can be determined for the given driving condition. The normalized tire force can also be determined, for example as the ratio of tire force and maximum tire force. For example, the normalized front braking force is calculated as follows:

$$NX_{brake} = \frac{-2 \cdot P_{MC} \cdot \rho_{F\_Bar2N}}{(\eta_{fl} + \eta_{fr}) \cdot \hat{\mu} \cdot M \cdot g} \tag{25}$$

where $P_{MC}$ is a master cylinder pressure measurement. Similarly, the normalized front longitudinal force requested by the driver is given by $$NX_{driver} = \frac{-2 \cdot P_{MC} \cdot \rho_{F\_Bar2N} \cdot \cos\delta - |F_y|\sin\delta}{(\eta_{fl} + \eta_{fr}) \cdot \hat{\mu} \cdot M \cdot g} \quad (26)$$

The difference between $NX_{driver}$ and $NX_{brake}$ represents the longitudinal force due to driver steering. That is $$NX_{steer} = NX_{driver} - NX_{brake} \quad (27)$$

Note that the calculations of $NX_{driver}$, $NX_{brake}$ and $NX_{steer}$ can be saturated such that they all belong to [−1, 0].

Due to $NX_{steer}$, one can imagine that the front tires already work harder than the rear tires to reduce vehicle speed. This situation is illustrated in FIG. 3, far left, as the vehicle heads forward in the direction indicated by arrow $V_x$. The tire force vectors are illustrated by arrows for each tire. In order to add a balance to the vehicle during the process of slowing it down, some exemplary embodiments of the curvature controller can start with increasing brake pressure only on the rear wheels to swing the rear tire force vector backwards (see central illustration of FIG. 3) until it is in parallel with the front tire force vector. Then, if needed, both the front and rear tire pressure are increased simultaneously (see far right illustration of FIG. 3), so that the front and rear tire force vectors are kept in parallel and are further rotated backwards. The magnitude of the individual tire forces are designed to be in proportion to the normal force on that wheel.

To have the same effect as $NX_{steer}$, the rear wheel brake pressures are given by $$P_{rl\_steer} = -\frac{NX_{steer} \cdot \eta_{rl} \cdot \hat{\mu} \cdot M \cdot g}{\rho_{R\_Bar2N}} \quad (28)$$

$$P_{rr\_steer} = -\frac{NX_{steer} \cdot \eta_{rr} \cdot \hat{\mu} \cdot M \cdot g}{\rho_{R\_Bar2N}} \quad (29)$$

where $\rho_{R\_Bar2N}$ is a conversion factor from rear brake pressure to longitudinal force, and $\eta_{rl}$ and $\eta_{rr}$ represent the normalized normal load on rear left and rear right wheel, respectively. If the sum of $P_{rl\_steer}$ and $P_{rr\_steer}$ and is equivalent to a higher longitudinal force than $T_{CC}$ is, $T_{CC}$ can simply be translated into the brake pressure of the rear wheels. $T_{CC}$ is then reset to zero. Otherwise, $T_{CC}$ can be adjusted to take into account the steering effect. See the following logic:

$$\text{if}\left(\frac{-T_{CC}}{R_{tire} \cdot \rho_{R\_Bar2N}} < P_{rl\_steer} + P_{rr\_steer}\right)$$

{

$$P_{rl\_steer} = \frac{-T_{CC}}{R_{tire} \cdot \rho_{R\_Bar2N}} \frac{\eta_{rl}}{\eta_{rl} + \eta_{rr}}$$

$$P_{rr\_steer} = \frac{-T_{CC}}{R_{tire} \cdot \rho_{R\_Bar2N}} - P_{rl\_steer}$$

$$T_{CC} = 0$$

}
else $$T_{CC} = T_{CC} + (P_{rl\_steer} + P_{rr\_steer}) \cdot \rho_{B\_Bar2N} \cdot R_{tire}$$

where $R_{tire}$ is the tire rolling radius.

The adjusted $T_{CC}$ can then be converted to a normalized longitudinal force $$NX_{CC} = \frac{T_{CC}}{R_{tire} \cdot \hat{\mu} \cdot M \cdot g} \quad (30)$$

Note that $NX_{CC} \leq 0$, since $T_{CC} \leq 0$. A normalized longitudinal curvature control request can be determined as $$NX_{request} = NX_{steer} + NX_{CC} \quad (31)$$

Furthermore, in certain embodiments of the invention, $NX_{request}$ can be limited such that it does not exceed $NX_{min}$, which is a design parameter normally chosen as −0.6 (i.e., 60% of the total tire force):

if $(NX_{request} < NX_{min})$ $$NX_{request} = NX_{min}$$

The limit helps prevent brake pressure from getting so high that lateral tire force is washed out, which means that brake pressure gets so high that it generates a longitudinal tire force that reduces the tire's lateral force capability.

Another consideration for limiting $NX_{request}$ is preventing rapid brake pressure buildup from increasing path radius by imposing a $$\frac{dR}{dt} \leq 0$$

condition in certain embodiments of the invention, where R is path radius. If NX is the requested normalized longitudinal force of the previous control loop, and assuming that tire force has reached its limit, it follows from Newton's Second Law that:

$$R = \frac{v^2}{\sqrt{1 - NX^2} \cdot g \cdot \hat{\mu}} \quad (32)$$

in which v is the vehicle speed. From equation (32), the derivative of R with respect to time is calculated:

$$\frac{dR}{dt} = \frac{2 \cdot v}{\sqrt{1 - NX^2} \cdot g \cdot \hat{\mu}} \cdot \frac{dv}{dt} + \frac{(1 - NX^2)^{-1} \cdot v^2 \cdot NX}{\sqrt{1 - NX^2} \cdot g \cdot \hat{\mu}} \cdot \frac{dNX}{dt} \leq 0 \quad (33)$$

which can be further simplified as $$2 \cdot \frac{dv}{dt} + (1 - NX^2)^{-1} \cdot v \cdot NX \cdot \frac{dNX}{dt} \leq 0 \quad (34)$$

Note that the deceleration of the vehicle dv/dt is given by $$\frac{dv}{dt} NX \cdot g \cdot \hat{\mu} \quad (35)$$

Substituting (35) into (34) results in the following lower bound on the changes in $NX_{request}$:

$$dNX_{min} = -2 \cdot \Delta t \cdot g\hat{\mu} \cdot (1 - NX^2)/v$$

if $(NX_{request} < NX + dNX_{min})$ $$NX_{request} = NX + dNX_{min} \quad (36)$$

where $\Delta t$ is a sampling period (or control loop time). Similarly, to prevent sudden decrease in radius, a $$\frac{dR}{dt} \geq 0$$

condition can be imposed so that the pressure request does not drop too fast. Following the same steps as in (32)-(36), an upper bound on the changes in $NX_{request}$ can be obtained:

$$dNX_{max} = 2 \cdot \Delta t \cdot g \cdot \hat{\mu} \cdot (1 - NX^2)/v$$

if $(NX_{request} > NX + dNX_{max})$ $$NX_{request} = NX + dNX_{max} \quad (37)$$

In some exemplary embodiments, to ensure that curvature control functions only when it is needed, a counter $CC_{counter}$ can be designed according to the following logic:

```
if ( ( (CC_torque || ((NX_request ≤ NX_steer ) && CC_enable )) && (| β̂ |< β_Limit ) )
{
    if (CC_counter < MAX_loop)
        CC_counter = CC_counter + 1
}
else if (CC_counter > 0)
    CC_counter = CC_counter − 1
``` where $MAX_{loop}$ is a design parameter, $\hat{\beta}$ is the estimated sideslip angle and $\beta_{Lim}$ is its limit, and $CC_{enable}$ is the previous loop enter/exit flag. The curvature controller can be enabled when the counter does not indicate "Time Out" and the vehicle speed is greater than 5 (m/s). That is, $$CC_{enable} = (v > 5 \text{ m/s}) \&\& (CC_{counter} > 0) \quad (38)$$

The curvature control command NX for this loop can thus be determined as follows:

if $(CC_{enable}) NX = NX_{request}$ else $NX = NX_{steer}$

NX can then be translated into individual brake pressure request in proportion to the normal load on that wheel:

```
if (CC_enable)
{
```

$$P_{fl\_cc} = -\frac{1}{\rho_{F\_Bar2N}}(NX \cdot \eta_{fl} \cdot \hat{\mu} \cdot M \cdot g + |F_{yfl} \cdot \sin \delta|)\frac{1}{\cos\delta} \quad (39)$$

if $(P_{fl\_cc} > CC_{counter} \cdot \Delta t \cdot MAX_{rate})$
$P_{fl\_cc} = CC_{counter} \cdot \Delta t \cdot MAX_{rate}$ $$P_{fr\_cc} = -\frac{1}{\rho_{F\_Bar2N}}(NX \cdot \eta_{fr} \cdot \hat{\mu} \cdot M \cdot g + |F_{yfr} \cdot \sin \delta|)\frac{1}{\cos\delta} \quad (40)$$

if $(P_{fr\_cc} > CC_{counter} \cdot \Delta t \cdot MAX_{rate})$
$P_{fr\_cc} = CC_{counter} \cdot \Delta t \cdot MAX_{rate}$ $$P_{rl\_cc} = P_{rl\_steer} - \frac{1}{\rho_{R\_Bar2N}}(NX - NX_{steer}) \cdot \eta_{rl} \cdot \hat{\mu} \cdot M \cdot g \quad (41)$$

if $(P_{rl\_cc} > CC_{counter} \cdot \Delta t \cdot MAX_{rate})$
$P_{rl\_cc} = CC_{counter} \cdot \Delta t \cdot MAX_{rate}$ $$P_{rr\_cc} = P_{rr\_steer} - \frac{1}{\rho_{R\_Bar2N}}(NX - NX_{steer}) \cdot \eta_{rr} \cdot \hat{\mu} \cdot M \cdot g \quad (42)$$

-continued if $(P_{rr\_cc} = CC_{counter} \cdot \Delta t \cdot MAX_{rate})$
$P_{rr\_cc} = CC_{counter} \cdot \Delta t \cdot MAX_{rate}$ else
{
    $P_{fl\_cc} = 0$
    $P_{fr\_cc} = 0$
    $P_{rl\_cc} = 0$
    $P_{rr\_cc} = 0$
} where $MAX_{rate}$ is a design parameter that limit how fast the pressure requests can change per loop.

Utilizing the above curvature control module, alone or in addition to an engine torque reduction module, vehicle stability control can be improved.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. Thus, for example, reference to "a restraint device" includes two or more different restraint devices. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the systems and methods of the present disclosure without departing from the scope its teachings. Other embodiments of the disclosure will be apparent to those skilled in the art from consideration of the specification and practice of the teachings disclosed herein. It is intended that the specification and examples be considered as exemplary only.

What is claimed is:

1. A system for controlling vehicle stability, the system comprising:

a controller configured to receive one or more of input signals from vehicle sensors and calculations from previously-executed code indicative of whether the vehicle is oversteering or understeering, wherein the controller is configured to reduce a speed of the vehicle to correct for understeering or oversteering when the vehicle is understeering or oversteering, wherein the controller is configured to send a signal to apply brake pressure to a wheel at an outside corner of the vehicle when the vehicle is oversteering and configured to send a signal to apply brake pressure to a wheel at an inside corner of the vehicle when the vehicle is understeering, wherein the controller sends a signal to apply brake pressure to all four vehicle wheels when application of brake pressure at the outside corner wheel or inside corner wheel does not make an actual vehicle response close enough to a target vehicle response, and wherein the target vehicle response is based on at least a steering wheel angle and a vehicle speed, and the actual vehicle response is based on a vehicle yaw rate or a vehicle sideslip gradient and sideslip angle.

2. The system of claim 1, wherein the controller is configured to send a signal to apply brake pressure such that, upon initially applying brake pressure to rear wheels of the vehicle, balance is added to the vehicle while slowing the vehicle by swinging a rear tire force vector backwards until it is in parallel with a front tire force vector.

3. The system of claim 2, wherein the controller is configured to send a signal to apply brake pressure to front and rear brakes of the vehicle simultaneously after application of brake pressure to the rear brakes of the vehicle.

4. The system of claim 3, wherein, when brake pressure is applied to the front and rear brakes of the vehicle simultaneously, the controller is configured to send a signal to apply brake pressure so that the front and rear tire force vectors are kept in parallel and are further rotated backwards.

5. The system of claim 4, wherein the controller is configured to send a signal to apply brake pressure such that a magnitude of the brake pressure applied to each brake is in proportion to a normal force on the wheel to which the brake pressure is applied.

6. The system of claim 1, wherein the controller is configured to determine oversteer and understeer conditions of the vehicle by comparing a target vehicle yaw rate with an actual vehicle yaw rate.

7. The system of claim 1, wherein the controller desensitizes control of engine torque reduction during transient maneuvers using control deadbands.

8. A system for controlling stability of a vehicle, the system comprising:

a brake system; and a controller configured to control the brake system and receiving one or more of input signals from vehicle sensors and calculations from previously-executed code indicative of whether a vehicle is oversteering or understeering and, when the vehicle is oversteering or understeering, reducing a speed of the vehicle to correct for the oversteering or understeering, wherein the controller sends a signal to apply brake pressure to a wheel at an outside corner when the vehicle is oversteering, sends a signal to apply brake pressure to a wheel at an inside corner when the vehicle is understeering, and sends a signal to apply brake pressure to the vehicle's rear wheels when application of brake pressure at the outside corner wheel or inside corner wheel does not make an actual vehicle response close enough to a target vehicle response, and wherein the target vehicle response is based on at least a steering wheel angle and a vehicle speed, and the actual vehicle response is based on a vehicle yaw rate or a vehicle sideslip gradient and sideslip angle.

9. The system of claim 8, wherein the controller is configured to send a signal to apply brake pressure such that, upon initially applying brake pressure to the rear wheels of the vehicle, balance is added to the vehicle while slowing the vehicle by swinging a rear tire force vector backwards until it is in parallel with a front tire force vector.

10. The system of claim 9, wherein the controller is configured to send a signal to apply brake pressure to front and rear brakes of the vehicle simultaneously after application of brake pressure to the rear brakes of the vehicle.

11. The system of claim 10, wherein when brake pressure is applied to the front and rear brakes of the vehicle simultaneously, the controller is configured to send a signal to apply the brake pressure so that the front and rear tire force vectors are kept in parallel and are further rotated backwards.

12. The system of claim 11, wherein the controller is configured to send a signal to apply brake pressure such that a magnitude of the brake pressure applied to each brake is in proportion to a normal force on the wheel to which the brake pressure is applied.

13. A system for controlling stability of a vehicle, the system comprising:

a brake system; and a controller configured to receive one or more of input signals from vehicle sensors and calculations from previously-executed code indicative of whether a vehicle is oversteering or understeering and, when the vehicle is oversteering or understeering, reducing a speed of the vehicle to correct for the oversteering or understeering, wherein the controller sends a signal to apply brake pressure to a wheel at an outside corner when the vehicle is oversteering, sends a signal to apply brake pressure to a wheel at an inside corner when the vehicle is understeering, and sends a signal to reduce engine torque when application of brake pressure at the outside corner wheel or inside corner wheel does not make an actual vehicle response close enough to a target vehicle response, and wherein the target vehicle response is based on at least a steering wheel angle and a vehicle speed, and the actual vehicle response is based on a vehicle yaw rate or a vehicle sideslip gradient and sideslip angle.

14. The system of claim 13, wherein the controller is configured to send a signal to apply brake pressure to rear wheels of the vehicle when application of brake pressure at the outside corner wheel or inside corner wheel does not make the actual vehicle response close enough to the target vehicle response.

15. The system of claim 14, wherein the controller is configured to send a signal to apply brake pressure such that, upon initially applying brake pressure to rear wheels of the vehicle, balance is added to the vehicle while slowing the vehicle by swinging a rear tire force vector backwards until it is in parallel with a front tire force vector.

16. The system of claim 15, wherein the controller is configured to send a signal to apply brake pressure to front and rear brakes of the vehicle simultaneously after application of brake pressure to the rear brakes of the vehicle.

17. The system of claim 16, wherein, when brake pressure is applied to the front and rear brakes of the vehicle simultaneously, the controller is configured to send a signal to apply the brake pressure so that the front and rear tire force vectors are kept in parallel and are further rotated backwards.

18. The system of claim 17, wherein the controller is configured to send a signal to apply brake pressure such that a magnitude of the brake pressure applied to each brake is in proportion to a normal force on the wheel to which the brake pressure is applied.

* * * * *